United States Patent Office 3,268,528
Patented August 23, 1966

3,268,528
PROCESS FOR DIALKYL-s-TRIAZINES
Henryk Bader, North Plainfield, and Erwin Richard Ruckel, Westfield, N.J., assignors to American Cyanamid Company, Stamford, Conn., a corporation of Maine
No Drawing. Filed June 28, 1963, Ser. No. 291,265
8 Claims. (Cl. 260—248)

The present invention relates to an improved process for the preparation of alkyl-s-triazines by reacting a suitable "starting" s-triazine, in a fluid medium, with a Grignard reagent. More particularly, the invention is concerned with carrying out the reaction in an improved liquid medium comprising an inert, chlorinated, aliphatic-hydrocarbon solvent.

As shown in abandoned application for United States Letters Patent, Serial No. 268,464, filed on March 27, 1963, by Henryk Bader, one of the present inventors, suitable "starting" triazines for such reactions include halo-s-triazines of the general formula

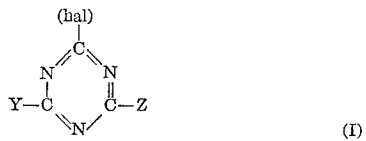

(I)

Illustratively, the procedure of the above-noted application may be shown by the following reaction scheme

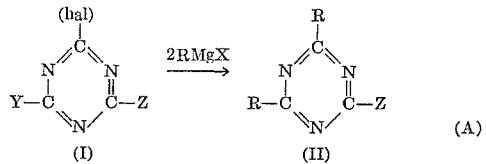

which is hereinafter designated as reaction (A). In the foregoing formulae, the several symbols are defined as follows:

R is an alkyl, cycloalkyl or aralkyl, capable of forming the desired Grignard reagent RMgX;
(hal) is a halogen, usually chlorine or bromine;
X is chlorine, bromine or iodine;
Y is (hal) or —OR$^1$;
R$^1$ is methyl, ethyl or n-propyl;
Z is (hal) or OR$^2$ or R$^3$;
R$^2$ is selected from the same group as R$^1$; and
R$^3$ is "R" or an aryl.

It should be noted that in the foregoing definitions "X" is distinguished from the term "halogen" as the latter is used above in defining (hal), "Y" and "Z." The term "halogen" and the symbol (hal) include fluorine; "X" does not. The several symbols as defined above will be used throughout the following discusison as having the same meaning unless otherwise specifically noted.

In the above-noted application, reaction between the "starting" s-triazine and the Grignard reagent was carried out by combining the two reactants in a suitable solvent. It was found convenient therein to use the solvent in which the Grignard reagent is prepared. Although it was noted that either order of addition could be used, it was considered advantageous to add a solution of the Grignard reagent to a solution or suspension of the s-triazine in the solvent. It was further noted that there should be provision for good mixing of the reactants.

Reaction was usually carried out at the ambient temperature of from about 10° to about 30° C., but temperatures somewhat beyond this range could be used if so desired. When diethyl ether was used as the solvent, heat of reaction was removed by allowing the solvent to reflux during reaction.

When the reaction was completed, as indicated by the disappearance of the Grignard reagent according to well-known test procedures, the products were separated from the reaction mixture by any convenient method. This may include the addition of water to the reaction mixture, followed by separation and collection of the organic solvent solution containing the desired product of the reaction.

Unfortunately, however, despite the seemingly desirable simplicity of that procedure to produce compounds of Formula II, reaction rates were found too low. Moreover, it was found that several competing reactions could and did take place. Products were obtained as a mixture of triazines and the desired compound of (II) was often obtained in smaller yield than some products of competing reactions. As a result, the final yield of desired product often was lower than desirable in a process suitable for economical development on a commercial scale.

Nevertheless, the advantages of that process over those previously known are such that if the yield of desired product could be improved, the process would offer definite industrial promise. It is accordingly the principal object of the present invention to devise a method of obtaining such an increase in potential yield.

Surprisingly, this object has been accomplished by a relatively simple, but unexpectedly successful modification of the above-noted process. In general, this modification may be quite simply described.

A Grignard reagent is prepared in the usual way, utilizing a suitable solvent normally employed for the purpose. However, the resultant solution is not used directly as the reaction medium. Instead, a starting triazine of (I) is separately dissolved in a halogenated, aliphatic hydrocarbon solvent. The two solutions are then combined to form the reaction medium. The resulting reaction not only produces a better yield of desired product, but reduced amounts of side reaction products are formed.

As so described, however, the simplicity of the improved procedure is more apparent than real. A number of factors must be given careful consideration and control. Otherwise, optimum results are not obtainable. Accordingly, each will be considered separately.

Although "R" in RMgX as defined above and in the noted copending application did not include "aryl," it should be understood that in the present invention the term "Grignard reagent" means alkyl, cycloalkyl, aralkyl or aryl magnesium halides of the formula RMgX. They are prepared by standard and well-known procedures using a suitable alkyl, cycloalkyl, aryl or aralkyl halide having the desired value for "R." Although the process of the present invention is not limited thereto, of particular interest are compounds produced when R is lower alkyl of one to four carbon atoms.

As defined herein, "R" may be alkyl of from 1 to 18 carbon atoms, of either branched or straight chains, such as methyl, ethyl, propyl, decyl and octadecyl; cycloalkyl of from 5 to 7 carbon atoms, such as cyclopentyl and cyclohexyl; aralkyl of from 7 to 11 carbon atoms, such as benzyl, phenethyl and naphthylmethyl; and aryl of less than three condensed rings, such as phenyl and naphthyl.

The halide usually will be a bromide or chloride, less often an iodide. Useful halides include, for example, methyl chloride, ethyl bromide, n-propyl iodide, isopropyl bromide, secondary butyl bromide, tertiary butyl chloride, n-hexyl iodide, 1,1-diethyl-n-propyl bromide, n-hexadecyl bromide, cyclohexyl chloride, benzyl chloride, bromobenzene, 2-bromonaphthalene and the like. The Grignard reagent may be prepared in a solvent normally used for this purpose, e.g., diethyl ether, di-n-butyl ether, tetrahydrofuran and the like. The preferred solvents are diethyl ether and tetrahydrofuran.

As to the s-triazine starting material of (I) above, those of primary interest in the present invention are those in which "Z" is chlorine, bromine or "—$OR_2$." However, as noted above, the present process per se is not necessarily limited thereto. This will be discussed below in more detail.

It is preferred but not essential that a solution of the Grignard reagent, usually in the solvent in which it is prepared, be added to a solution or suspension of the starting triazine. As to the chlorinated aliphatic hydrocarbon solvent in which the starting triazine is dissolved or suspended before addition thereto of the Grignard reagent solution, methylene chloride is preferred for several reasons. Other methylene halides are not as readily available. Longer-chain alkylene halides generally are not as effective in solvent power for the triazine. Generally, also, they are less readily evaporated. Accordingly, in this discussion methylene chloride will be taken as illustrative.

In amount, the methylene chloride should comprise at least half of the total solvent volume of the reaction mixture. Below about this amount, the yield of dialkyl-s-triazines falls off, the decrease being very appreciable when as little as 30% is present. As a maximum there is no particular limit. In general, amounts of from about 50% to about 80% of the total solvent volume is good practice.

As to the reactant proportions, they are not particularly critical. About one molecular equivalent of the Grignard reagent coordinates with the s-triazine without further participation, although a slight excess may be desirable. Too great an excess, however, seems to favor the competing side reactions. A good practice is to add about one mol of RMgX per atom or group to be replaced plus about 0.5 to 2.0 mols per mol of s-triazine.

Conducting the reaction at temperatures below 0° C. is very important. While monoalkyl-s-triazines can be prepared at temperatures above 0° C., the next alkylation step is favored by low temperatures. Above about 0° C., competing reactions may take place faster than the second alkylation. Below 0° C., such side reactions occur to less extent than does the second alklylation. In general, the reaction temperature range should be between about 0° C. and about minus 20° C. Lower temperatures can be used but the advantages do not offset the difficulty.

Control of reaction time is essential to obtaining optimum results. Particularly is this true when the starting triazine is cyanuric chloride or other halo-s-triazine. By the time the second alkylation has taken place and a halo-dialkyls-s-triazine has formed it tends to quaternize with itself, forming a polymer. For any one set of reaction conditions such as volume, temperature, stirring efficiency and the like, there is an optimum time. Exact limits cannot be set to cover all such combinations. In general, however, reaction periods of from about two to about six hours will constitute good practice.

Among the products of the reaction, in addition to the desired dialkyl-s-triazines, in most cases only two types are formed to appreciable extent. These are mono-alkyl-s-triazines and trialkyl-s-triazines. The former is often formed in equal or greater amount than the desired dialkyl-s-triazines. They are recovered and recycled, thus increasing the eventual yield of dialkyl. The trialkyl by-products which have no particular utility in this invention fortunately form only in relatively small amounts usually below about one percent.

THE "STARTING" TRIAZINES

It will be seen from the foregoing Formulae I and II that within their scope several different types of triazines may be formulated. For example, although $R^1$ and $R^2$ are selected from the same group they need not necessarily be identical. Referring to Formula I, it will be seen that halo-s-triazine starting materials of use in reaction (A) may have the following combinations of substituents:

| Class | 2-Position | 4-Position | 6-Position |
|---|---|---|---|
| 1 | Halogen | Halogen | Halogen. |
| 2 | do | do | Alkoxy. |
| 3 | do | do | Alkyl (or aryl). |
| 4 | do | Alkoxy | Alkoxy. |
| 5 | do | do | Alkyl (or aryl). |

Thus, five classes of starting materials are shown in the above table, each class having at least one halogen atom.

For purposes of reaction (A) of this invention these five classes may be divided into two general groups according to the nature of the reaction carried out in (A). "Group I" includes classes 1, 2, and 3; "Group II" those of classes 4 and 5. In carrying out reaction (A) two halogens of the compounds of Group I are replaced by "R" of the Grignard reagent. In using compounds of Group II, one halogen and one alkoxy are replaced. Each group will be considered separately.

Compounds of the classes 1–3, comprising Group I, may be typically illustrated by the following compounds.

*Class 1* consists of cyanuric halides such as cyanuric bromide and cyanuric chloride; and mixed cyanuric halides, such as 2,4-dichloro-6-bromo-s-triazine or 2-chloro-4,6-dibromo-s-triazine.

*Class 2* consists of dihalomonoalkoxy-s-triazines, such for example as 2,4-dichloro-6-methoxy-s-triazine, 2,4-dibromo-6-methoxy-s-triazine, 2,4-dichloro - 6 - ethoxy-s-triazine and 2,4-dichloro - 6 - n - propoxy-s-triazine. These compounds are prepared by reacting the corresponding cyanuric halide with a suitable alcohol.

*Class 3* consists of dihalomonoalkyl- and/or dihalo-monoaryl-s-triazines such for example as 2,4-dichloro-6-methyl-s-triazine, 2,4-dibromo-6-methyl-s-triazine, 2,4-dichloro - 6 - ethyl-s-triazine, 2,4 - dichloro-6-isopropyl-s-triazine, 2,4-dichloro-6-benzyl-s-triazine, 2,4-dichloro-6-cyclohexyl-s-triazine, 2,4-dichloro - 6 - phenyl-s-triazine and 2,4-dichloro-6-o-tolyl-s-triazine. Such compounds are prepared by reacting a suitable cyanuric halide with a suitable Grignard.

As to Group II, typical compounds according to the present invention may be illustrated by the following listing and examples.

*Class 4* consists of monohalodialkoxy-s-triazines such for example as 2-chloro-4,6-dimethoxy-s-triazine, 2-bromo-4,6-dimethoxy-s-triazine and 2-bromo-4,6-dimethoxy-s-triazine. Compounds of this class are formed, like those of class 2, from a cyanuric halide and an alcohol.

*Class 5* consists of halo-alkoxyalkyl- and/or halo-alkoxyaryl-s-triazines such as 2 - chloro-4-methoxy-6-methyl-s-triazine and 2 - chloro-4-methoxy-6-phenyl-s-triazine. They may be prepared by reacting the corresponding dihaloalkyl- or dihaloaryl-s-triazine of Class 3 under alkaline conditions with an alcohol or with an alkali metal alcoholate.

In the foregoing discussion, at least one group in the starting triazines of (I) was necessarily (hal). The present invention, however, is not necessarily so limited. For example, triazines of the formula

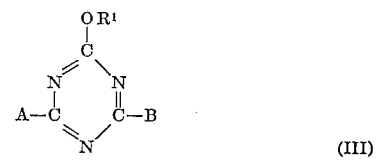

(III)

(in copending application, Serial No. 267,343, filed March 22, 1963, by F. X. Markley and assigned to a common assignee) have been shown to undergo a similar reaction with a similar Grignard reagent, as shown in the following reaction scheme (B) to obtain products within the scope of (II)

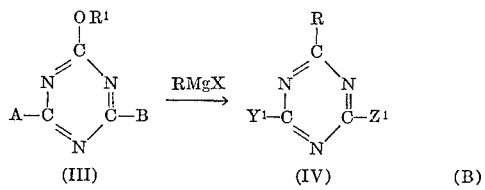

(III)   (IV)   (B)

In reaction (B) and Formulae III and IV

A and B are each $OR^2$ or $R^3$;
$Y^1$ and $Z^1$ are each R; $OR^2$ or $R^3$; and the other symbols have the meanings indicated above. Such alkoxy-s-triazines of (III) also may be used as suitable "starting" triazines in the process of the present invention.

Within the scope of Formulae II and IV, three types of compounds may be prepared having the following structures:

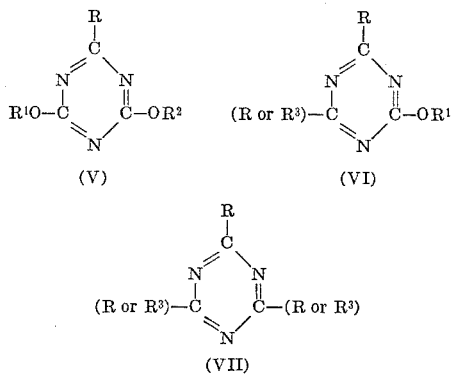

wherein R, $R^1$, $R^2$ and $R^3$ have the same meanings as defined above.

Some 2,4-dialkoxy-6-alkyl compounds of Formula V heretofore have been prepared by reacting the corresponding 2,4-dichloro-6-alkyl-s-triazine with an alcohol and sodium hydroxide [Khromov-Borisov et al., Zhur. Obshchei Khim. 29, 3010 (1959); C.A. 54, 12153i (1960)]. Some 2,4-dichloro-6-alkyl-s-triazines have been prepared (a) by reacting cyanuric chloride with an alkyl Grignard reagent [Overberger et al., J. Am. Chem. Soc. 79, 941 (1957)] or (b) by reacting 2,4-dihydroxy-6-alkyl-s-triazines with phosphorous oxychloride (British Patent No. 680,652).

The one-step process of this invention for preparing an s-triazine of Formula V may be illustrated by the following reaction (C):

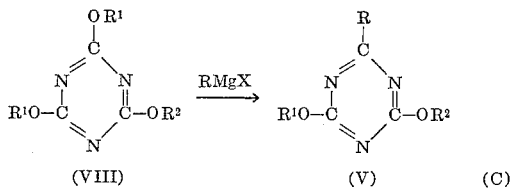

(VIII)   (V)   (C)

Compounds of Formula VII also have been previously prepared by various methods including among others:

(a) Trimerization of nitriles to give trialkyl-s-triazines; and
(b) Cyclizations of imino ethers with ammonia.

Again, the process of the present invention will be seen to offer a simpler and more direct route to the desired s-triazines.

In general, starting compounds of Formula III above, for use in reaction (B), fall into three classes which may be represented by the following formulae:

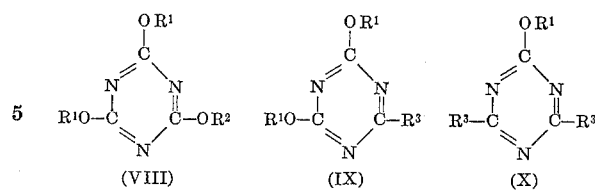

(VIII)   (IX)   (X)

To the first class belong the cyanurates of Formula VIII. To the second belong the 2-alkyl-, 2-cycloalkyl-, 2-aralkyl- and 2-aryl-4,6-dialkoxy-s-triazines of Formula IX. To the third, the 2,4-dialkyl-, 2,4-dicycloalkyl-, 2,4-diaralkyl- and 2,4-diaryl-6-alkoxy-s-triazines of Formula X.

Illustrative cyanurates of Formula VIII include, for example, trimethyl cyanurate, triethyl cyanurate, tri-n-propyl cyanurate, and mixed cyanurates such as 2,4-dimethoxy-6-ethoxy-s-triazine. Such cyanurates are made by reacting cyanuric chloride with the appropriate alcohol in the presence of caustic soda [J. Am. Chem. Soc. 73, 2986 (1951)].

Illustrative dialkoxy-s-triazines of Formula IX include, for example, 2,4-dimethoxy-6-methyl-s-triazine; 2,4-dimethoxy-6-ethyl-s-triazine; 2,4-diethoxy-6-ethyl-s-triazine; 2,4-di-n-propoxy-6-methyl-s-triazine; 2,4-diethoxy-6-phenyl-s-triazine; 2,4-di-n-propoxy-6-cyclohexyl-s-triazine; 2,4-dimethoxy-6-benzyl-s-triazine; and mixed alkoxy compounds such as 2-methoxy-4-ethoxy-6-ethyl-s-triazine, and the like. In addition to the process of this invention, compounds of Formula IX may be made as described above for compounds of Formula V, since Formulae V and IX are essentially alike.

Illustrative monoalkoxy-s-triazines of Formula X include 2,4-dimethyl-6-methoxy-s-triazine; 2,4-diethyl-6-methoxy-s-triazine; 2,4-di-n-octyl-6-ethoxy-s-triazine; 2,4-di-cyclohexyl-6-methoxy-s-triazine; 2,4-diphenyl-6-methoxy-s-triazine; 2,4-dibenzyl-6-ethoxy-s-triazine and the like. In addition to the process of this invention, compounds of Formula X also may be made as described above for the compounds of Formula VI, since Formulae VI and X also are essentially the same.

From this discussion of "starting" triazines, with respect to the several formulae, particularly (I) and (III), and of the various symbols relating thereto, it will be seen that considerable scope is encompassed. For purposes of simplification in definition the several formulae for suitable starting triazines may be combined as follows:

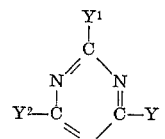

wherein:

(1) "Y" is selected from "X" and "$OR^1$";
(2) Each of "$Y^1$" and "$Y^2$" is selected from "X," "R" and "$OR^1$"; but only one of "$Y^1$" and "$Y^2$" may be "R";
(3) Each "X" is selected from chlorine, bromine and iodine (as above) but all "X's" need not be the same;
(4) Each "R" is selected from alkyl, cycloalkyl, aryl and aralkyl capable of forming the desired Grignard reagent RMgX (as above); and
(5) Each "$R^1$" is a lower normal alkyl of 1–3 carbons (as above) but all "$R^1$'s" need not be identical.

The invention will be further illustrated in conjunction with the following examples. Therein all parts and percentages are by weight and temperatures are in degrees centigrade, unless otherwise noted. Parts by volume are to the parts by weight as milliliters and grams of water are to each other.

*Example 1*

To a solution of 60 parts (0.25 mol) of trimethyl cyanurate in 2000 parts of methylene chloride at minus 15°

C. is slowly added with stirring 436 parts by volume of a diethyl ether solution containing 123 parts (1.4 mols) ethylmagnesium chloride and stirring is continued for six hours at minus 15° C.; followed by the slow addition, at below 10° C., of 200 parts of water. Resultant precipitate is collected by filtration, washed with methylene chloride. The filtrates and washings are combined, the solvent evaporated under reduced pressure and the residue is fractionally distilled. Eighteen parts (30% of theory) of the 2,4-diethyl-6-methoxy-s-triazine product is obtained. The remainder constituted a large 2-ethyl-4,6-dimethoxy-s-triazine fraction and a very small 2,4,6-triethyl-s-triazine fraction.

*Example 2*

For purposes of comparison with the previously-noted procedure, 0.2 mol part of ethylmagnesium bromide in 70 parts of diethyl ether is added under reflux to 0.1 mol part of trimethyl cyanurate in 70 parts of ether. The volume is doubled by addition of benzene, the ether is removed by distillation, the residual solution refluxed for seven hours and then evaporated. The yield comprising the mixed products of Example 1, amounts to less than 10% of theory before separation.

*Example 3*

To a stirred solution of 6.45 (0.035 mol) parts of cyanuric chloride in 400 parts of methylene chloride is added, at minus 15° C., 0.14 mol part of ethylmagnesium chloride in 48 parts by volume of diethyl ether. Stirring is continued at minus 15° C. for about 3 hours, followed by slow addition at minus 15° C. of 18 parts of water, followed by addition of 20 parts of magnesium sulfate. The solids are filtered out and washed with a small amount of methylene chloride. The combined filtrate and methylene chloride washings are evaporated under reduced pressure. The residue is extracted with hot pentane and the pentane removed by evaporation. Distillation of the residual oil gave a liquid (3 parts) assaying 90% 2-chloro-4,6-diethyl-s-triazine, a yield 45% of theory.

*Example 4*

For purposes of comparison, the procedure of Example 3 is repeated except that diethyl ether is the only solvent used. The product yield is only 21% of theory.

*Example 5*

Under the conditions of Example 3, 2,4-dichloro-6-methoxy-s-triazine yielded a mixture of triazines assaying 2-chloro-4,6-diethyl-s-triazine (a 19.2% yield); 2,4-diethyl-6-methoxy-s-triazine (a 26.0% yield); 2-chloro-4-ethyl-6-methoxy-s-triazine (a 14.77% yield) and 2,4,6-triethyl-s-triazine (a 1.8% yield). The total yield of dialkyl products is 45.2% of theory.

*Example 6*

Under the conditions of Example 3, 2-chloro-4,6-dimethoxy-s-triazine yielded a mixture of triazines assaying 2,4-diethyl-6-methoxy-s-triazine (a 16.2% yield); 2-chloro-4,6-diethyl-s-triazine; 2-chloro-4-ethyl-6-methoxy-s-triazine (a 7.9% yield); 2-ethyl-4,6-dimethoxy-s-triazine (a 31% yield) and 2,4,6-triethyl-s-triazine (a 1.8% yield). The total yield of dialkyl products is 17.6% of theory.

*Example 7*

To illustrate conversion in situ of a 2,4-dialkyl-6-halo-s-triazine to a 2,4-dialkyl-6-alkoxy-s-triazine, the conditions of Example 3 are repeated on a four-fold scale through the three-hour stirring period. At this point, the reaction mixture is poured into a stirred mixture of 80 parts of methanol and 34 parts of anhydrous potassium carbonate, maintaining the temperature between 0° and 10° C. Stirring is continued for ten hours at room temperature. Thereafter, 56 parts of water is added at minus 10° C., the precipitate being separated by filtration, washed and the solvent fractions worked up as in Example 3. The product fractions are 2,4-diethyl-6-methoxy-s-triazine (11.4 parts, 45% of theory), 2-ethyl-4,6-dimethoxy-s-triazine (1.8 parts) and 2,4,6-triethyl-s-triazine (0.5 part).

*Example 8*

A solution of methylmagnesium bromide, prepared from 6.8 parts (0.28 mol) of magnesium and 21.6 parts (0.25 mol) of methyl bromide, in 75 parts of diethyl ether is added slowly to a suspension of 21.3 parts (0.10 mol) of triethyl cyanurate in 175 parts of methylene chloride at minus 15° C. Stirring is continued for about five hours at minus 15° C. Water is added to the resultant reaction mixture, the precipitate is removed by filtration and the combined filtrate and washings are evaporated under reduced pressure. The residue is vacuum distilled to separate 2-methyl,4,6-diethoxy-s-triazine, 2,4-dimethyl-6-ethoxy-s-triazine and 2,4,6-trimethyl-s-triazine.

*Example 9*

In the procedure of Example 1, 45 parts by volume of a 2.48 molar solution of ethylmagnesium chloride (0.125 mol) in tetrahydrofuran is slowly added at room temperature to a suspension of 12.8 parts (0.05 mol) of tri-n-propyl cyanurate in about 175 parts of methylene chloride. The products are 2-ethyl-4,6-di-n-propoxy-s-triazine and 2,4-diethyl-6-n-propoxy-s-triazine.

*Example 10*

In the procedure of Example 1, a solution of ethylmagnesium bromide, prepared from 4.0 parts (0.165 mol) of magnesium and 16.4 parts (0.15 mol) of ethyl bromide, in 50 parts of diethyl ether is added slowly at minus 15° C. to a suspension of 17.1 parts (0.10 mol) of trimethyl cyanurate in 150 parts of methylene chloride. The residue comprises a mixture of 2-ethyl-4,6-dimethoxy-s-triazine, 2,4-diethyl-6-methoxy-s-triazine and unreacted trimethyl cyanurate. The products are separated by distillation.

*Example 11*

In the procedure of Example 1, a solution of ethylmagnesium bromide, prepared from 10.7 parts (0.44 mol) of magnesium and 48.5 parts (0.04 mol) of ethyl bromide, in 125 parts of diethyl ether is added slowly at minus 15° C. to a suspension of 17.1 parts (0.10 mol) of trimethyl cyanurate in 350 parts of methylene chloride. The residue is vacuum distilled to separate 2,4,6-triethyl-s-triazine and 2,4-diethyl-6-methoxy-s-triazine.

*Example 12*

In the procedure of Example 1, a solution of n-butylmagnesium chloride in diethyl ether, prepared from 6.8 parts (0.28 mol) of magnesium, 34.2 parts (0.25 mol) of n-butyl bromide and 100 parts of diethyl ether, is added slowly at minus 15° C. to a suspension of 21.3 parts (0.10 mol) of triethyl cyanurate in 175 parts of methylene chloride. The products are 2-n-butyl-4,6-diethoxy-s-triazine, 2,4-di-n-butyl-6-ethoxy-s-triazine and 2,4,6-tri-n-butyl-s-triazine.

*Example 13*

In the procedure of Example 1, a solution of n-hexadecylmagnesium bromide in diethyl ether, prepared from 4.0 parts (0.165 mol) of magnesium, 45.8 parts (0.15 mol) of n-hexadecyl bromide and 150 parts of ether, is added slowly at minus 15° C. to a suspension of 17.1 parts (0.10 mol) of trimethyl cyanurate in 150 parts of methylene chloride. The resultant products comprise 2-n-hexadecyl-4,6-dimethoxy-s-triazine and unreacted trimethyl cyanurate.

*Example 14*

In the procedure of Example 1, a solution of cyclohexylmagnesium bromide, prepared from 6.8 parts (0.28 mol) of magnesium and 40.8 parts (0.25 mol) of cyclohexyl bromide, in 125 parts of diethyl ether is added slowly to a suspension of 21.3 parts (0.10 mol) of triethyl cyanurate in 175 parts of methylene chloride at minus 15° C. The residual oil is distilled in vacuo, thereby separating 2-cyclohexyl-4,6-diethoxy-s-triazine, 2,4-di-cyclohexyl-6-ethoxy-s-triazine and 2,4,6-tricyclohexyl-s-triazine.

*Example 15*

In the procedure of Example 1, a solution of phenylmagnesium bromide in diethyl ether, prepared from 6.8 parts (0.28 mol) of magnesium, 39.3 parts (0.25 mol) of bromobenzene and 125 parts of ether, is added slowly at minus 15° C. to a suspension of 17.1 parts (0.10 mol) of trimethyl cyanurate in 150 parts of methylene chloride. The products comprise 2-phenyl-4,6-dimethoxy-s-triazine, 2,4-diphenyl-6-methoxy-s-triazine and 2,4,6-triphenyl-s-triazine.

*Example 16*

In the procedure of Example 1, a solution of benzylmagnesium bromide in diethyl ether, prepared from 4.0 parts (0.165 mol) of magnesium, 25.6 parts (0.15 mol) of benzyl bromide and 90 parts of ether, is slowly added at minus 15° C. to a suspension of 17.1 parts (0.10 mol) of trimethyl cyanurate in 150 parts of methylene chloride. The resultant products comprise 2-benzyl-4,6-dimethoxy-s-triazine, 2,4-dibenzyl-6-methoxy-s-triazine and unreacted trimethyl cyanurate.

*Example 17*

In the procedure of Example 1, a solution of ethylmagnesium bromide (0.15 mol) in 90 parts of ether is added slowly at minus 15° C. to a suspension of 21.7 parts (0.10 mol) of 2,4-dimethoxy-6-phenyl-s-triazine in 400 parts of methylene chloride. The product comprises 2-ethyl-4-phenyl-6-methoxy-s-triazine and a smaller amount of 2,4-diethyl-6-phenyl-s-triazine.

*Example 18*

In the procedure of Example 1, a solution of ethylmagnesium bromide, prepared from 6.8 parts (0.28 mol) of magnesium and 27.3 parts (0.25 mol) of ethyl bromide, in 80 parts of diethyl ether is added slowly at minus 15° C. to a suspension of 15.5 parts (0.10 mol) of 2,4-dimethoxy-6-methyl-s-triazine in 150 parts of methylene chloride. The residual oil is distilled to give 2,4-diethyl-6-methyl-s-triazine.

*Example 19*

In the procedure of Example 1, a solution of ethylmagnesium bromide prepared from 4.37 parts (0.18 mol) of magnesium and 16.4 parts (0.15 mol) of ethyl bromide, in 45 parts of diethyl ether is added slowly at minus 15° C. to a suspension of 28.7 parts (0.10 mol) of 2,4-diphenyl-6-methoxy-s-triazine in 300 parts of methylene chloride. The residue contains 2-ethyl-4,6-diphenyl-s-triazine.

*Example 20*

In the process of Example 3, a solution of 15.9 parts (0.05 mol) of cyanuric bromide in 300 parts of methylene chloride at minus 15° C. is reacted with 62.5 parts by volume of 3.2 molar solution of ethylmagnesium chloride (0.2 mol) in diethyl ether. The products comprise 2,4-diethyl-6-bromo-s-triazine, 2-ethyl-4,6-dibromo-s-triazine and 2,4,6-triethyl-s-triazine.

*Example 21*

A solution of n-butylmagnesuim bromde in diethyl ether prepared from 10.7 parts (0.44 mol) of magnesium, 54.8 parts (0.40 mol) of n-butyl bromide and 200 parts of diethyl ether is added slowly at a temperature below minus 10° C. to a solution of 18.4 parts (0.1 mol) of cyanuric chloride in 500 parts of methylene chloride. After a reaction period of 5 hours, 30 parts of water is added. The reaction mixture is filtered and the solvent evaporated. The residue is distilled to separate 2,4-di-n-butyl-6-chloro-s-triazine, 2-n-butyl-4,6-dichloro-s-triazine and 2,4,6-tri-n-butyl-s-triazine.

*Example 22*

The procedure of Example 21 is followed with subsituation of 122.0 parts (0.40 mol) of n-hexadecyl bromide for the n-butyl bromide. The reaction products contain 2,4-di-n-hexadecyl-6-chloro-s-triazine.

*Example 23*

The procedure of Example 21 is followed with substitution of 42.6 parts (0.40 mol) of cyclohexyl bromide for the n-butyl bromide. The reaction product comprises 2-cyclohexyl-4,6-dichloro-s-triazine, 2,4-dicyclohexyl-6-chloro-s-triazine and 2,4,6-tricyclohexyl-s-triazine.

*Example 24*

The procedure of Example 3 is followed with substitution of 6.23 parts (0.035 mol) of 2,4-dichloro-6-ethyl-s-triazine for the cyanuric chloride. The products comprise 2,4-diethyl-6-chloro-s-triazine and 2,4,6-triethyl-s-triazine.

*Example 25*

The procedure of Example 3 is followed with substitution of 7.92 parts (0.035 mol) of 2,4-dichloro-6-phenyl-s-triazine for the cyanuric chloride. The products comprise 2,4-diethyl-6-phenyl-s-triazine and 2-chloro-4-ethyl-6-phenyl-s-triazine.

*Example 26*

The procedure of Example 3 is followed with substitution of 7.13 parts (0.035 mol) of 2-chloro-4,6-diethoxy-s-triazine for the cyanuric chloride. The products comprise 2,4-diethyl-6-ethoxy-s-triazine and 2-ethyl-4,6-diethoxy-s-triazine.

*Example 27*

The procedure of Example 3 is followed with substitution of 6.08 parts (0.035 mol) of 2-chloro-4-methoxy-6-ethyl-s-triazine for the cyanuric chloride. The products comprise 2,4,6-triethyl-s-triazine and 2,4-diethyl-6-methoxy-s-triazine.

The 2-chloro-4-methoxy-6-ethyl-s-triazine is prepared by reacting one mol of 2,4-dichloro-6-ethyl-s-triazine with one mol of sodium methylate in methanol.

*Example 28*

The procedure of Example 3 is followed with substitution of 8.75 parts (0.035 mol) of 2-chloro-4-ethoxy-6-o-tolyl-s-triazine for the cyanuric chloride. The product contains 2,4-diethyl-6-o-tolyl-s-triazine.

The 2-chloro-4-ethoxy-6-o-tolyl-s-triazine is prepared by reacting one mol of 2,4-dichloro-6-o-tolyl-s-triazine with one mol of sodium ethylate in ethanol.

We claim:

1. In a process for preparing alkyl-s-triazines, the improvement which comprises: (1) forming a solution of a Grignard reagent of the formula RMgX in the solvent in which said reagent is prepared; (2) combining an s-triazine of the following formula

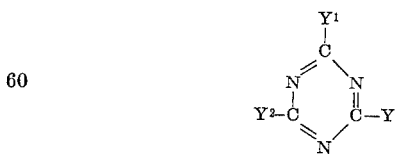

with a compatible, inert, chlorinated aliphatic-hydrocarbon solvent; (3) under agitation, combining the resulting products of steps (1) and (2); (4) continuing said agitation until reaction is substantially completed; and (5) collecting the resultant alkyl-s-triazine product; wherein, in the foregoing formulae the several constituents have the following values:

R is selected from the group consisting of (a) the straight and branched chain alkyls of from 1 to 18 carbon atoms; (b) the cycloalkyls of from 5 to 7 carbon atoms; (c) the monocyclic aralkyls of from 7 to 11 carbon atoms; and (d) the carbocyclic aryls of less than three condensed rings;

X is selected from the group consisting of chlorine, bromine and iodine;

Y is selected from the group consisting of chlorine, bromine and iodine;

$Y^1$ is selected from the group consisting of chlorine, bromine, iodine and $R^2$;

$Y^2$ is selected from the group conssting of chlorine, bromine, iodine and $R^2$;

each "Y," "$Y^1$" and "$Y^2$" being the same or a different member of the defined group; and each "$R^2$" being the same or a different member of the same group as "R," not more than one of "$Y^1$" and "$Y^2$" being "R2."

2. A process according to claim 1 in which Y is chlorine, $Y^1$ is chlorine and $Y^2$ is ethyl.

3. A process according to claim 1 in which Y is chlorine, $Y^1$ is chlorine and $Y^2$ is phenyl.

4. A process according to claim 1 in which said chlorinated, aliphatic-hydrocarbon solvent is methylene chloride.

5. A process according to claim 1 in which Y, $Y^1$ and $Y^2$ are chlorine.

6. A process according to claim 1 in whch Y, $Y^1$ and $Y^2$ are bromine.

7. A process according to claim 1 in which the R is ethyl and X is chlorine.

8. A process according to claim 1 in which the R is ethyl and X is bromine.

References Cited by the Examiner
UNITED STATES PATENTS 3,083,242   3/1963   Ramsden _____ 260—248 X

OTHER REFERENCES

Kharasch et al.: "Grignard Reactions of Nonmetallic Substances," Prentice-Hall, New York (1954), pp. 1015, 1030 and 1046–1059.

WALTER A. MODANCE, *Primary Examiner.*

JOHN M. FORD, *Assistant Examiner.*